United States Patent
Block et al.

(10) Patent No.: US 7,240,088 B2
(45) Date of Patent: Jul. 3, 2007

(54) NODE SELF-START IN A DECENTRALIZED CLUSTER

(75) Inventors: Timothy Roy Block, Rochester, MN (US); Robert Miller, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/057,188

(22) Filed: Jan. 25, 2002

(65) Prior Publication Data

US 2003/0145050 A1    Jul. 31, 2003

(51) Int. Cl.
*G06F 15/16* (2006.01)
(52) U.S. Cl. .............. 709/201; 709/217; 709/218; 709/221; 707/10; 707/202
(58) Field of Classification Search ........... 709/204, 709/206, 217, 221; 707/10, 202
See application file for complete search history.

(56) References Cited

U.S. PATENT DOCUMENTS

| 5,666,486 A * | 9/1997 | Alfieri et al. ............. 709/217 |
|---|---|---|
| 5,793,962 A | 8/1998 | Badovinatz et al. |
| 5,805,786 A | 9/1998 | Badovinatz et al. |
| 5,923,831 A | 7/1999 | Palmer et al. |
| 5,999,712 A | 12/1999 | Molin et al. |
| 6,014,669 A * | 1/2000 | Slaughter et al. ............. 707/10 |
| 6,104,871 A | 8/2000 | Badovinatz et al. |
| 6,108,699 A * | 8/2000 | Moiin ........................ 709/221 |
| 6,952,766 B2 | 10/2005 | Dervin et al. |
| 2004/0139125 A1* | 7/2004 | Strassburg et al. .......... 707/202 |

* cited by examiner

*Primary Examiner*—Yves Dalencourt
(74) *Attorney, Agent, or Firm*—Patterson & Sheridan, LLP

(57) ABSTRACT

Methods, systems and articles of manufacture for automatically starting a node in a clustered computer system. A starting state value may be assigned to the node and a discovery process initiated to find a sponsor node. If a sponsor node is found, the node is joined with the sponsor node in the clustered computer system. If a sponsor node is not found, the node is started as a one-node cluster in the clustered computer system. An active state value is assigned to the node upon inclusion into the clustered computer system.

23 Claims, 5 Drawing Sheets

NODE SELF-START IN A DECENTRALIZED CLUSTER

BACKGROUND OF THE INVENTION

1. Field of the Invention

The present invention generally relates to clustered computer systems, and in particular, to the starting of node operations.

2. Description of the Related Art

"Clustering" generally refers to a computer system organization where multiple computers or nodes are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group. One example of a protocol utilized by many clusters is a membership change protocol, which permits member jobs to be added to or removed from a group.

Protocols are also used at the node level. For example, a node start protocol enables inactive or offline nodes to join a cluster. The manner in which nodes are added to a cluster depends upon whether the cluster is centralized or decentralized. In a centralized clustered computer system, a centralized or shared registry exists for storing its cluster membership information. Accordingly, starting a node in that system requires accessing the centralized or shared registry and updating the registry with the node information.

On the other hand, in a decentralized clustered system, no centralized or shared registry for storing its cluster membership exists. Instead, the cluster membership is stored in each node residing in the system. Thus, starting an inactive or offline node in this system requires the sponsorship of another node that is already a member of the cluster. A disadvantage of this system is that the sponsor node has no knowledge of when the particular node is ready to be sponsored. The sponsor node typically becomes aware of this information through manual intervention of a system administrator, which necessarily is prone to human error. A problem further arises when no member node exists in the cluster to serve as a sponsor. That is, each node would form its own one-node cluster, and thereby forming multiple disjointed one-node clusters.

Therefore, a significant need exists in the art for an improved method of starting a node in a decentralized cluster system without the problems and disadvantages of the current art.

SUMMARY OF THE INVENTION

The present invention generally relates to methods for starting a node in a clustered computer system. The starting node has a clustering infrastructure. First, the clustering infrastructure of the starting node is started. The clustering infrastructure then assigns the starting node a state value of starting. Then, the clustering infrastructure conducts a process to discover a sponsor node in the clustered computer system to sponsor the node into joining the clustered computer system. The node is started as a one-node cluster in the clustered computer system if no sponsor node is discovered. On the other hand, the node is joined into the clustered computer system if the sponsor node is discovered. The clustering infrastructure then assigns the node a state value of active.

In conducting the node discovery, a cluster ping message is sent to one or more potential sponsor nodes in the clustered computer system by the clustering infrastructure. The clustering infrastructure then receives a response from the one or more potential sponsor nodes. The first potential sponsor node having a state value of active is then selected from the response as the sponsor node to sponsor the node into joining the clustered computer system. If no potential sponsor node having a state value of active responds to the cluster ping message, then a responding node having a state value of starting and having a name lower than the name of the requesting node is selected from the response as the sponsor node to sponsor the requesting node into joining the clustered computer system An embodiment of the present invention is directed to a computer program for starting a node in a clustered computer system. The computer program includes: a code segment for starting the clustering infrastructure of the node; a code segment for assigning the node a state value of starting by the clustering infrastructure; a code segment for discovering, by the clustering infrastructure, a sponsor node in the clustered computer system to sponsor the node into joining the clustered computer system; a code segment for starting the node as a one-node cluster in the clustered computer system if no sponsor node is discovered; a code segment for joining the node into the clustered computer system if the sponsor node is discovered; and a code segment for assigning the node a state value of active by the clustering infrastructure.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
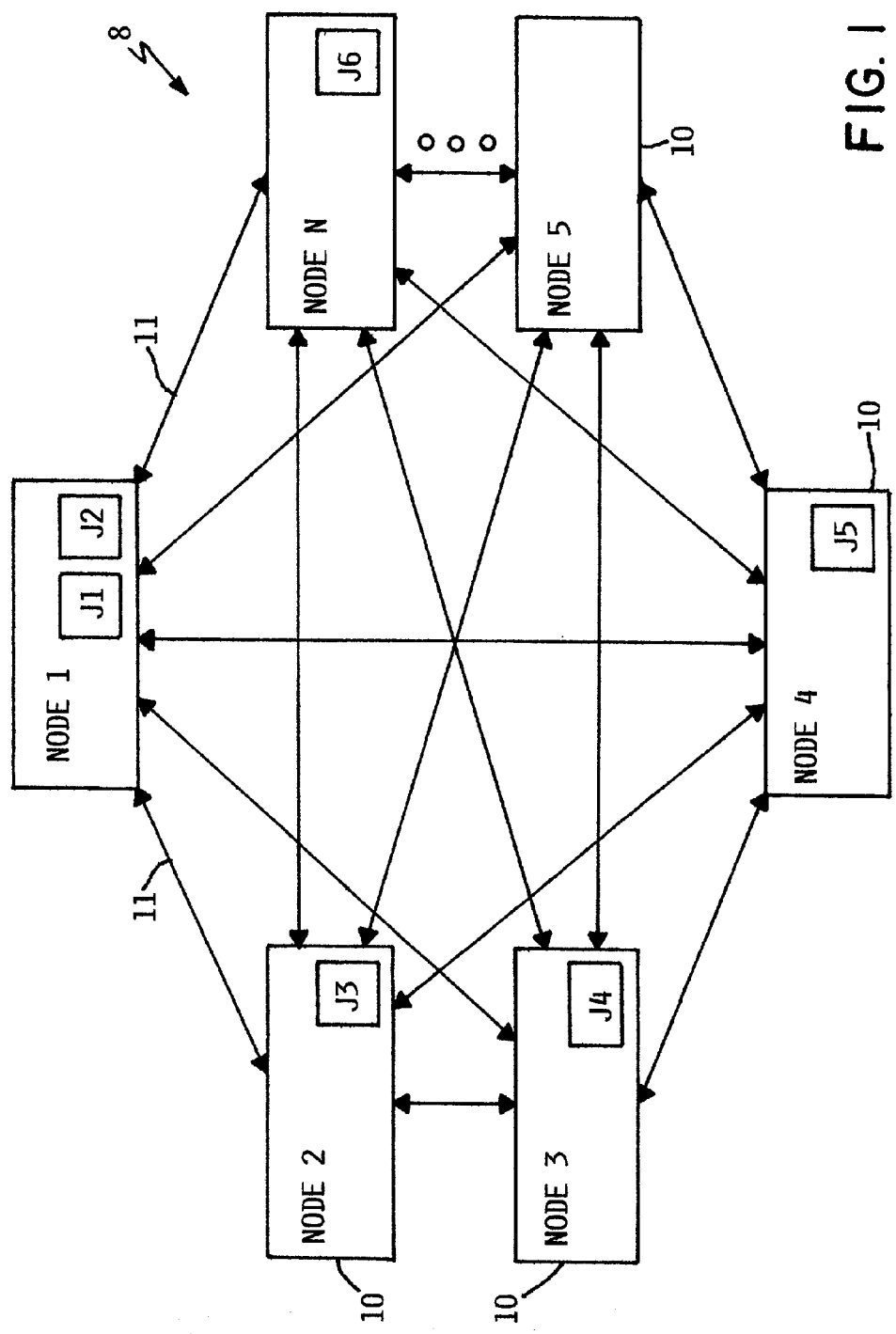
FIG. 1 is a is a block diagram of a clustered computer system consistent with the invention.

The present invention generally relates to methods for starting a node in a clustered computer system. More particularly, the embodiments are directed to methods for starting a node by itself, which include a sponsor node discovery process. In one embodiment, the present invention is directed to enhancing group communications and providing a local state value to indicate whether the node has completed its starting protocol. In another embodiment, the present invention is directed to methods for self-starting a node in a decentralized clustered computer system.

First, the clustering infrastructure of the node is started. The clustering infrastructure then assigns the node a state value of starting. Then, the clustering infrastructure conducts a process to discover a sponsor node in the clustered computer system to sponsor the node into joining the clustered computer system. The node is started as a one-node cluster in the clustered computer system if no sponsor node is discovered. On the other hand, the node is joined into the clustered computer system if the sponsor node is discovered. The clustering infrastructure then assigns the node a state value of active.

Embodiments of the present invention can be implemented as a program product for use with a computer system such as, for example, the clustered computer system 8 shown in FIG. 1 and described below. The program(s) of the program product defines functions of the embodiments (including the methods described below with reference to FIGS. 3–5) and can be contained on a variety of computer readable storage media. Illustrative computer readable storage media include, but are not limited to: (i) information permanently stored on non-writable storage media (e.g., read-only memory devices within a computer such as CD-ROM disks readable by a CD-ROM drive): or (ii) alterable information stored on writable storage media (e.g., floppy disks within a diskette drive or hard-disk drive). Information stored on such media may be conveyed to a computer by a communications medium, such as through a computer or telephone network, including wireless communications. The latter embodiment specifically includes information downloaded from the Internet and other networks. Such computer readable storage media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. More specifically, the routines executed to implement the embodiments of the present invention may by part of automated scripts that are triggered at initial program load (IPL) time, for instance. The computer program of the present invention is typically comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In one embodiment, the mechanisms of the present invention are incorporated and used in a clustered computer system 8, such as the one depicted in FIG. 1. As shown in FIG. 1, the clustered computer system 8 may include a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

Each processing node is, for instance, an eServer iSeries computer available from International Business Machines, Inc., of Armonk, N.Y. The nodes 10 are connected to one another to allow for communication. The connections 11 between the nodes 10 represent logical connections, and the physical connections can vary within the scope of the present embodiments so long as the nodes 10 in the clustered computer system 8 can logically communicate with each other. Connecting computers together on a network requires some form of networking software. Networking software typically defines a protocol for exchanging information between computers on a network. Many different network protocols are known in the art. Examples of commercially available networking software include Novell NetWare and Windows NT, which each implement different protocols for exchanging information between computers. One particular protocol that may be used to advantage is Transmission Control Protocol/Internet Protocol (TCP/IP).

The distributed computing environment of FIG. 1 is only one example. It is possible to have more or less than three nodes. Further, the processing nodes do not have to be eServer iSeries computers. Some or all of the processing nodes can include different types of computers and/or different operating systems.

In the context of a clustered computer system, at least some computer tasks are performed cooperatively by multiple nodes executing cooperative computer processes (referred to herein as "jobs") that are capable of communicating with one another. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3 . . . N. Resident within various nodes is a plurality of jobs J1–J6 forming the members of an exemplary group in the clustered computer system. As shown in this figure, nodes in a clustered computer system are not required to participate in all groups (e.g., node 5). Moreover, multiple jobs from a given group may be resident in the same node (e.g., jobs J1 and J2 in node 1).

Also resident within each node is a clustering infrastructure referred to as clustering resource services, which typically manages various cluster functions such as starting and ending nodes, adding or removing nodes to or from a cluster, facilitating communication and synchronization between jobs of a node, and handling basic clustering functionality, including inter-node communications, message ordering, heartbeat monitoring, etc. Most, if not all, conventional clustering environments incorporate functionality analogous to clustering resource services.

It will be appreciated that nomenclature other than that specifically used herein to describe the handling of computer tasks by a clustered computer system may be used in other environments. Therefore, the invention should not be limited to the particular nomenclature used herein, e.g., as to protocols, requests, messages, jobs, groups, clustering resource services, etc.

Figure 2:
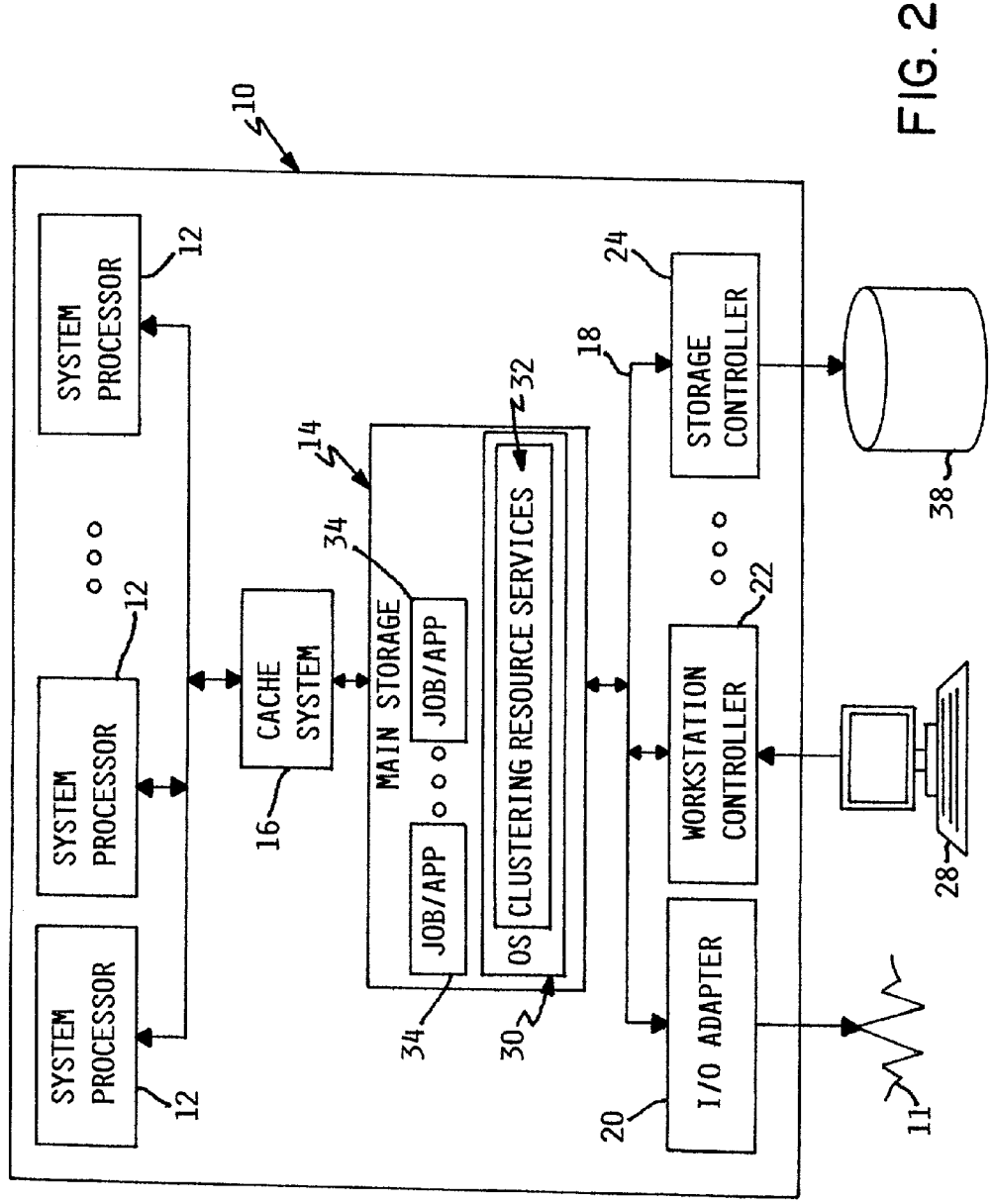
FIG. 2 is a is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 38. Any number of alternate computer architectures may be used in the alternative.

To implement self-starting node functionality consistent with the invention, at least each node requesting to be added to a cluster typically includes a clustering infrastructure to manage the clustering-related operations on the node. For example, node 10 is illustrated as having resident in main storage 14 an operating system 30 implementing a clustering infrastructure referred to as clustering resource services 32. One or more jobs or applications 34 are also illustrated, each having access to the clustering functionality implemented within clustering resource services 32. Moreover, clustering resource services 32 typically includes a cluster control ("CCTL") job that participates in a cluster control group to assist in managing clustering functionality on behalf of the node. Clustering resource services 32 typically further includes cluster communications ("CC"), which is responsible for delivering messages through the network. It will be appreciated, however, that the functionality described herein may be implemented in other layers of software in node 10, and that the functionality may be allocated among other programs, computers or components in clustered computer system 8. Therefore, the invention is not limited to the specific software implementation described herein.

Figure 3:
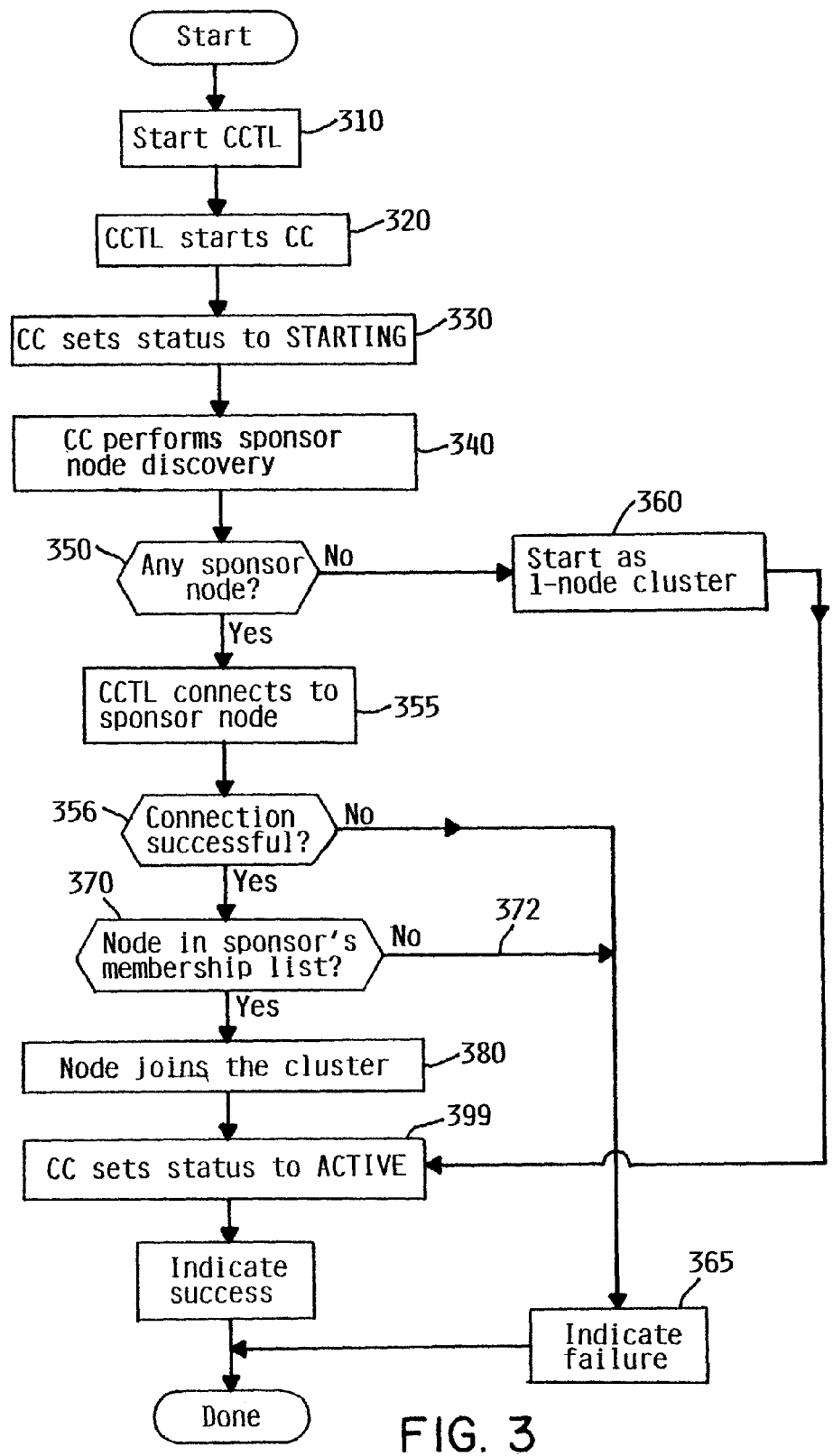
FIG. 3 is a flowchart illustrative of a method for starting a node in a clustered computer system in accordance with an embodiment of the present invention.
Figure 4:
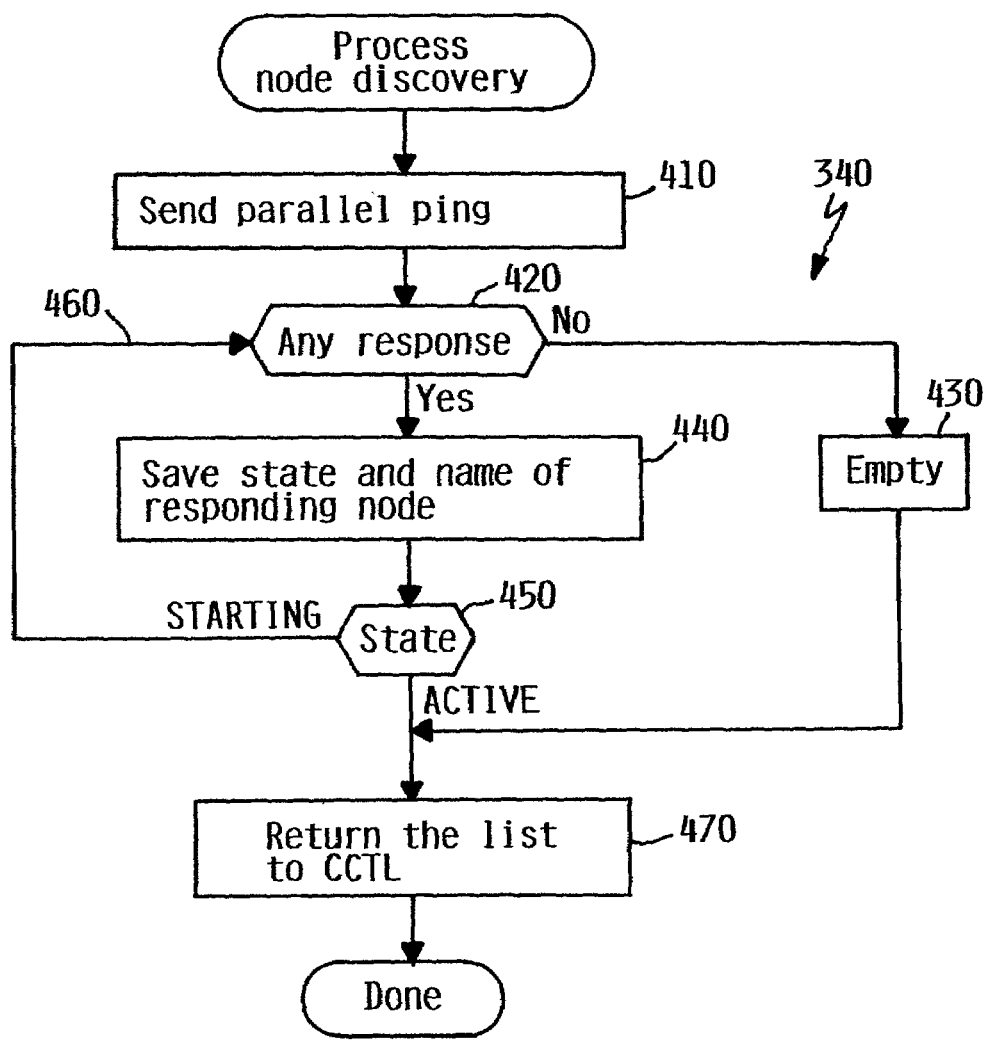
FIG. 4 is a flowchart illustrative of a node discovery process in accordance with an embodiment of the present invention.

Referring now to FIG. 3, a flowchart is shown illustrating of a method for starting a node (referred to herein as the "requesting node") in a clustered computer system in accordance with an embodiment of the present invention. The method begins with block 310 in which the cluster control is started. The cluster control then starts the cluster communications, as shown in block 320. In a decentralized clustered computer system, the cluster control of each node typically has a copy of the membership list. The membership list typically contains all the nodes that are members of a group of the clustered computer system as recorded by the cluster control prior to the node becoming inactive. Thus, when the cluster communications is started, the cluster control transfers a copy of the membership list to the cluster communications. Once the cluster communications is started, the cluster communications assigns the requesting node a state value of starting, as shown in block 330. Then, the cluster communications, upon request from the cluster control, searches for a sponsor node to sponsor the requesting node into joining the clustered computer system 8 (referred to as "node discovery"), as shown in block 340. In an embodiment, the node discovery is performed using the membership list. FIG. 4 illustrates the node discovery process detail.

Referring now to FIG. 4, a flowchart illustrative of a node discovery process 340 in accordance with an embodiment of the present invention is shown. One of the first steps in node discovery is sending a cluster ping message in parallel to all potential sponsor nodes in the clustered computer system 8, as shown in block 410. One or more potential sponsor nodes may respond to the cluster ping message. Consequently, block 420 illustrates the determination of whether any response has been received. In an embodiment, a discovery list is generated to keep track of the response. If no response has been received, then an empty list is returned to the cluster control, as shown in block 430. In accordance with one embodiment of the present invention, the time for which the potential sponsor nodes may respond is limited. Thus, if no response is received within the limited amount of time, then an empty list is also returned to the cluster control. On the other hand, block 440 illustrates that if there is a response, then the state value and the name of the potential sponsor node that responded to the parallel cluster ping message are recorded to a list. The state value of the potential sponsor node that responded is then determined, as shown in block 450. If the state value is starting, then the process continues by determining the next response, as shown by the arrow 460. On the other hand, if the state value is ACTIVE, then the node discovery process is complete, as shown in block 470. A determination is then conducted as to whether the list contains a sponsor node, as illustrated in FIG. 5.

Figure 5:
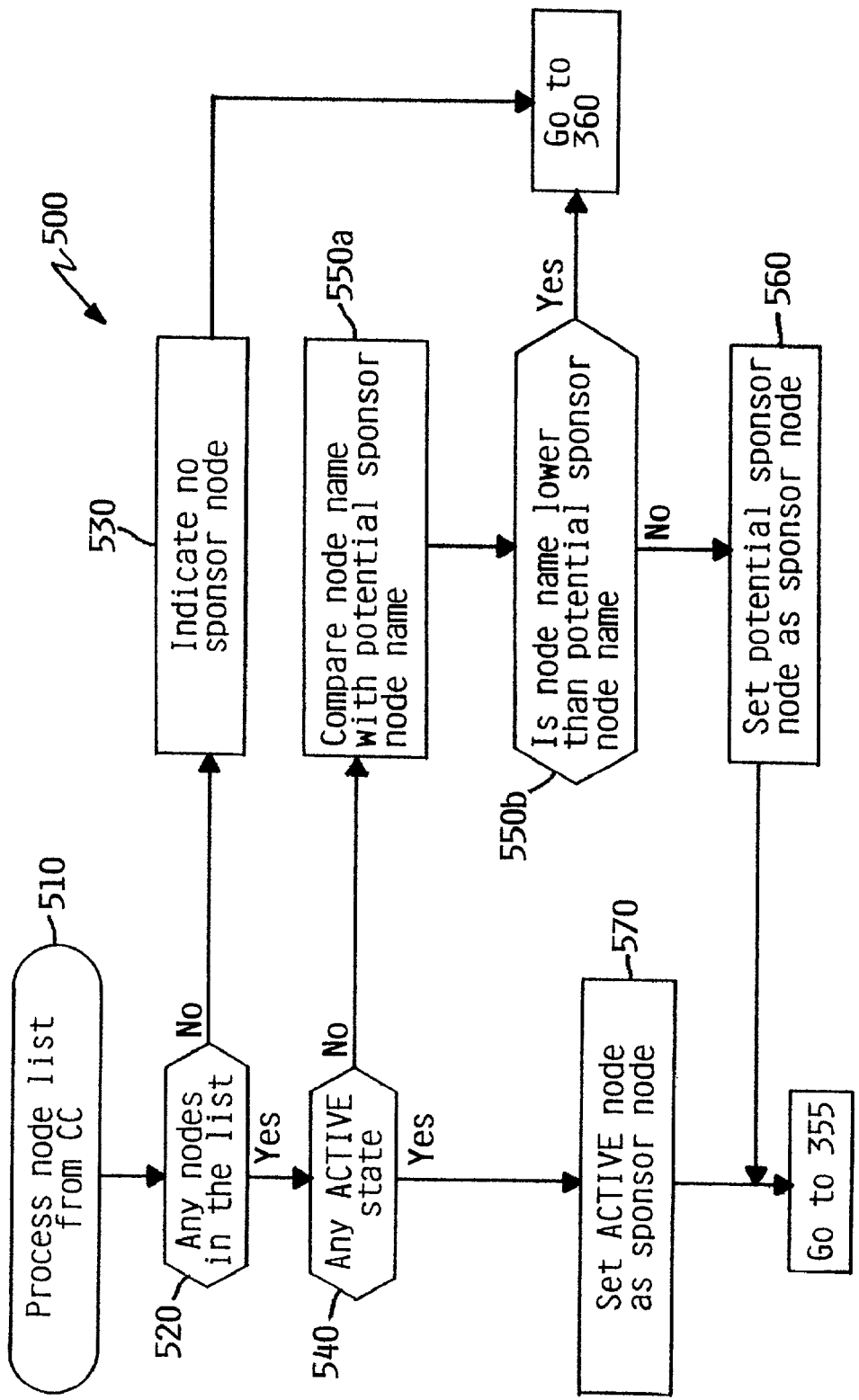
FIG. 5 is a flowchart illustrative of a determination whether a sponsor node exists in the clustered computer system in accordance with an embodiment of the present invention.

Referring now to FIG. 5, a flowchart illustrative of a method 500 for determining whether a sponsor node exists in the clustered computer system 8 in accordance with an embodiment of the present invention is shown. Block 510 begins the process in which the discovery list, which is recorded in FIG. 4, is processed. As illustrated by block 520, the method determines whether the list contains any potential sponsor nodes. An answer in the negative indicates that no potential sponsor node responded, i.e., no sponsor node exists, as shown in block 530. In such a case, the requesting node will start as one-node cluster, as indicated in block 360. On the other hand, if the answer is in the affirmative, then a determination whether the state value of the potential sponsor node is active is conducted, as indicated in block 540. If the determination at block 540 is in the negative, then the name of the node to be started (i.e., the requesting node) is compared with the name of the potential sponsor node on the list, as indicated in blocks 550a and b. If the name of the requesting node is lower than the name of the potential sponsor node, then the requesting node will start as a one-node cluster, as indicated in block 360. If the name of the potential sponsor node is lower than the name of the requesting node, then that potential sponsor node is selected as the sponsor node, as indicated in block 560. In one embodiment, the network addresses are compared as opposed to or in addition to the names of the nodes. If the potential sponsor node has a state value of active, then that potential sponsor node is selected as the sponsor node, as indicated in block 570. The above-described process obviates the potential of a deadlock situation in which multiple nodes concurrently start and the clustered computer system does not yet exist. In this manner, none of the starting nodes will mistakenly assume that another starting node is a sponsor node.

Referring back to FIG. 3, once the cluster communications completes its node discovery process, it notifies the cluster control of the result, i.e., the list, as shown in block 340. A determination is then made as to whether the list indicates the existence of a sponsor node, as illustrated in block 350. The detailed steps of block 350 are illustrated in FIG. 5. If the list indicates that no sponsor node exists, then the requesting node will start itself as a one-node cluster, as shown in block 360. This step is then followed by the cluster communications assigning the node a state value of active, as shown in block 399. If, on the other hand, the list indicates that a sponsor node exists, then the cluster control begins to initiate communication with the sponsor, as shown in block 355. In one embodiment, the cluster control connects to the sponsor node through INETD, which is a daemon program that listens for connection requests or messages for certain ports and starts server programs to perform the services associated with those ports. In another embodiment, the cluster control sends a request to start signal to the sponsor node. Next, a determination is made as to whether the connection was successful or not, as shown in block 356. An unsuccessful connection would indicate that the self-starting method had failed, as indicated by block 365. The unsuccessful connections may be caused by many factors, such as, a failed network, an incorrectly set up network, or the failure of the sponsor node. On the other hand, a successful connection would then lead to a determination whether the requesting node is in the sponsor node's membership list, as shown in block 370. This function is typically performed by the sponsor node. If the requesting node is not part of the sponsor node's membership list, then method has also failed, as indicated by the arrow 372. If the requesting node is part of the sponsor node's membership list, then the requesting node joins the clustered computer system, as shown in block 380. This step is generally performed by both the requesting node and the sponsor node. In conjunction with this step, the sponsor node may refresh the requesting node with its configuration information. This refresh may be particularly necessary if the configuration information has changed while the requesting node was offline. Once the requesting node has joined the clustered computer system, the cluster communications then assign the requesting node a starting value of ACTIVE, as shown in block 399. Once the requesting node has attain the state value of active, then the requesting node is capable of sponsoring other nodes, i.e., the requesting node has become a sponsor node.

While the foregoing is directed to embodiments of the present invention, other and further embodiments of the invention may be devised without departing from the basic scope thereof, and the scope thereof is determined by the claims that follow.

What is claimed is:

1. A method of programmatically starting a node in a clustered computer system, comprising:
   assigning a starting state value to the node;
   initiating an automated discovery process for discovering a sponsor node in the clustered computer system;
   starting the node as a one-node cluster in the clustered computer system if no sponsor node is discovered;
   joining the node into the clustered computer system if the sponsor node is discovered;
   assigning the node a state value of active by the clustering infrastructure; and
   storing the state value on a storage medium.

2. The method of claim 1, wherein the sponsor node has one of an active state value and a starting state value.

3. The method of claim 2, wherein the sponsor node has a name lower than the name of the node if the sponsor node has a starting state value.

4. The method of claim 1, wherein discovering a sponsor node in the clustered computer system to sponsor the node into joining the clustered computer system comprises:
   sending a cluster ping message to one or more potential sponsor nodes in the clustered computer system;
   receiving a response from the one or more potential sponsor nodes;
   selecting from the response the first potential sponsor node having a state value of active as the sponsor node to sponsor the node into joining the clustered computer system; and
   if no potential sponsor node having a state value of active responds to the cluster ping message, then selecting from the response a potential sponsor node having a state value of starting and having a name lower than the name of the node as the sponsor node.

5. The method of claim 4, wherein starting the node as a one-node cluster in the clustered computer system if no sponsor node is discovered comprises starting the node as a one-node cluster in the clustered computer system if the one or more potential sponsors have a state value of starting and a name higher than the name of the node.

6. The method of claim 4, further comprising starting the node as a one-node cluster in the clustered computer system if no response is received from the one or more potential sponsor nodes.

7. The method of claim 4, further comprising starting a clustering infrastructure of the node, wherein starting the clustering infrastructure of the node comprises:
   starting the cluster control; and starting the cluster communications by the cluster control.

8. The method of claim 7, wherein the discovering is performed by the clustering infrastructure of the node.

9. The method of claim 7, wherein the cluster control has a membership list containing the one or more potential sponsor nodes in the clustered computer system; wherein starting the cluster communications by the cluster control comprises transferring the membership list to the cluster communications by the cluster control; and wherein the cluster ping message is sent to the one or more potential sponsor nodes contained in the membership list.

10. The method of claim 1, wherein the sponsor node is discovered from a membership list containing all nodes in the clustered computer system.

11. The method of claim 7, wherein the cluster ping message is sent to the one or more potential sponsor nodes in the clustered computer system by the cluster communications.

12. The method of claim 7, wherein the node is assigned the state value of starting by the cluster communications.

13. The method of claim 7, wherein the node is assigned the state value of active by the cluster communications.

14. The method of claim 1, wherein the clustered computer system is a decentralized clustered computer system.

15. A computer program for starting a node in a clustered computer system embodied in a computer readable storage medium, the node having a clustering infrastructure, the computer program comprising:
   a code segment for starting the clustering infrastructure of the node;
   a code segment for assigning the node a state value of starting by the clustering infrastructure;
   a code segment for discovering, by the clustering infrastructure, a sponsor node in the clustered computer system to sponsor the node into joining the clustered computer system;
   a code segment for starting the node as a one-node cluster in the clustered computer system if no sponsor node is discovered;
   a code segment for joining the node into the clustered computer system if the sponsor node is discovered;
   a code segment for assigning the node a state value of active by the clustering infrastructure; and
   a code segment for storing the state value of active on a storage medium.

16. The computer program of claim 15, wherein the sponsor node has a state value of active or a state value of starting; and wherein the sponsor node has a name lower than the name of the node if the sponsor node has a state value of starting.

17. The computer program of claim 15, wherein the code segment for discovering, by the clustering infrastructure, a sponsor node in the clustered computer system to sponsor the node into joining the clustered computer system comprises:
   a code segment for sending a cluster ping message to one or more potential sponsor nodes in the clustered computer system by the clustering infrastructure;
   a code segment for receiving a response from the one or more potential sponsor nodes;
   a code segment for selecting from the response the first potential sponsor node having a state value of active as the sponsor node to sponsor the node into joining the clustered computer system; and
   a code segment for if no potential sponsor node having a state value of active responded to the cluster ping message, then selecting from the response the potential sponsor node having a state value of starting and having a name lower than the name of the node as the sponsor node to sponsor the node into joining the clustered computer system.

18. The computer program of claim 17, wherein the code segment for starting the node as a one-node cluster in the clustered computer system if no sponsor node is discovered comprises a code segment for starting the node as a one-node cluster in the clustered computer system if the one or more potential sponsors have a state value of starting and a name higher than the name of the node.

19. The computer program of claim 17, further comprising a code segment for starting the node as a one-node cluster in the clustered computer system if no response is received from the one or more potential sponsor nodes.

20. The computer program of claim 17, wherein the clustering infrastructure comprises cluster control and cluster communications.

21. The computer program of claim 20, wherein the code segment for starting the clustering infrastructure of the node comprises:
   a code segment for starting the cluster control; and
   a code segment for starting the cluster communications by the cluster control.

22. The computer program of claim 18, wherein the cluster control has a membership list containing the one or more potential sponsor nodes in the clustered computer system; and wherein the code segment for starting the cluster communications by the cluster control comprises a code segment for transferring the membership list to the cluster communications by the cluster control.

23. A node, comprising:
   a memory containing a node-starting program;
   a processor which, when executing the node-starting program, performs an operation comprising:
   assigning a starting state value to the node;
   initiating an automated discovery process for discovering a sponsor node in the clustered computer system;
   starting the node as a one-node cluster in the clustered computer system if no sponsor node is discovered;
   joining the node into the clustered computer system if the sponsor node is discovered; and
   assigning the node a state value of active by the clustering infrastructure.

* * * * *